(12) United States Patent
Sadri

(10) Patent No.: US 6,621,808 B1
(45) Date of Patent: Sep. 16, 2003

(54) ADAPTIVE POWER CONTROL BASED ON A RAKE RECEIVER CONFIGURATION IN WIDEBAND CDMA CELLULAR SYSTEMS (WCDMA) AND METHODS OF OPERATION

(75) Inventor: Ali S. Sadri, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/413,935

(22) Filed: Oct. 7, 1999

Related U.S. Application Data
(60) Provisional application No. 60/148,938, filed on Aug. 13, 1999.

(51) Int. Cl.[7] .............................................. H04B 7/216
(52) U.S. Cl. .................... 370/335; 370/320; 370/318; 370/468; 375/144; 375/148; 375/150; 455/522; 455/69
(58) Field of Search ................................ 370/335, 318, 370/468, 320; 455/422, 63, 69, 522, 273, 576; 375/144, 148, 150

(56) References Cited

U.S. PATENT DOCUMENTS

| | | | |
|---|---|---|---|
| 5,341,397 A | 8/1994 | Gudmundson ................ 375/1 |
| 5,383,219 A | 1/1995 | Wheatley, III et al. ......... 375/1 |
| 5,715,526 A | 2/1998 | Weaver, Jr. et al. ......... 455/126 |
| 5,729,557 A | 3/1998 | Gardner et al. ................ 371/41 |
| 5,754,541 A | 5/1998 | Glisic et al. ................ 370/335 |
| 5,778,316 A | 7/1998 | Persson et al. ............. 455/434 |
| 5,796,757 A | * 8/1998 | Czaja .......................... 371/46 |
| 5,822,318 A | * 10/1998 | Tiedemann, Jr. et al. ... 370/391 |
| 5,872,775 A | 2/1999 | Saints et al. ................ 370/342 |
| 6,061,553 A | * 5/2000 | Matsuoka et al. .......... 455/273 |
| 6,097,972 A | * 8/2000 | Saints et al. ................ 455/572 |
| 6,201,799 B1 | * 3/2001 | Huang et al. ............... 370/342 |
| 6,298,242 B1 | * 10/2001 | Schiff .......................... 455/522 |
| 6,335,922 B1 | * 1/2002 | Tiedemann, Jr. et al. ... 370/335 |
| 6,370,183 B1 | * 4/2002 | Newson et al. ............. 375/144 |
| 6,414,948 B1 | * 7/2002 | Sato ........................... 370/335 |

FOREIGN PATENT DOCUMENTS

JP  6-276176  9/1994  ............ H04J/13/00

OTHER PUBLICATIONS

"Adaptive Coding Rate and Process Gain Control with Channel Activation for Multi–Media DS/CDMA Systems" by. S. Abeta, S. Sampie, N. Morinaga, IEICE Trans. Commun., vol. E80–B, No. 4 Apr. 1997.

* cited by examiner

*Primary Examiner*—William Trost
*Assistant Examiner*—Danh C. Le
(74) *Attorney, Agent, or Firm*—Carlos Munoz-Bustamante; Winstead, Sechrest & Minick, P.C.

(57) ABSTRACT

A WCDMA system includes a Base Station (BS) or forward transmitter and a pilot channel that transmits control signals between a Mobile Station (MS) and BS to reconfigure their transmitter/receiver according to the prediction of the channel power and channel power probability density function separated into three distinct equal probable regions. Data signals are encoded using a one-half Viterbi encoder and interleaved. The interleaved data bits are modulated using Quadrature Phase Shift Keying (QPSK) modulation. The QPSK data is multiplexed with the pilot channel and spread by an appropriate code in an OFDM transmitter modified by a long code. Output of the transmitter may be provided to two diverse antennas for reliable communications to the receiver. Data may be received at two diverse antennas. The outputs are provided to match filters coupled to a coherent rake receiver and a channel prediction system. The future attenuation of the channel coefficients and power are determined by the prediction system for several milliseconds. The power levels of each finger in the Rake receiver can be predicted and the strongest ones used in determining the optimum transmitter power or rate control for operating the system transmitters and receivers based on computing a long range power prediction of each finger of a rake receiver.

12 Claims, 10 Drawing Sheets pdf of channel power at the beginning of each slot

ADAPTIVE POWER CONTROL BASED ON A RAKE RECEIVER CONFIGURATION IN WIDEBAND CDMA CELLULAR SYSTEMS (WCDMA) AND METHODS OF OPERATION

This invention claims the benefit of the filing date of Provisional Application, Serial No. 60/148,938 filed Aug. 13, 1999, entitled "Adaptive Transmitter Power Control Based Of Rake Receiver Configuration", assigned to the assignee of the present invention and fully incorporated herein by reference.

RELATED APPLICATION

This invention is related to copending application, Ser. No. 09/413,991, filed Oct. 7, 1999 entitled "Adaptive Power Control In Wideband CDMA Cellular Systems (WCDMA) And Methods Of Operation", assigned to the same assignee as that of the present invention and fully incorporated herein by reference.

BACKGROUND OF INVENTION (1) Field of Invention

This invention relates to communication systems and methods of operation. More particularly, the invention relates to adaptive power management based on a Rake Receiver configuration in WCDMA systems and methods of operation.

(2) Description of the Prior Art

In wireless communication system, signal fading due to multipath radio propagation severely degrades the performance and imposes high transmitter power requirement. Since the characteristic of a channel changes rapidly, a transmitter and a receiver can not be configured to operate at their optimum performance level and therefore, they fail to exploit full potential of the wireless system. Code-Division Multiple Access (CDMA) provides increased capacity due to the fact that each user in this system occupies the entire frequency band and therefore there is no waste of bandwidth due to channel spacing. Several systems have been proposed for the third generation wireless system. The most popular system under study is the Wideband CDMA (W-CDMA) system, described in an article entitled "Channel Estimation for the W-CDMA System, Performance and Robustness Analyses from a Terminal Perspective," by B. Lindof, C. Ostberg, and H. Eriksson, published at the IEEE Vehicular Technology Conference. Document 90. May 1999.

Developers of the third generation wireless system in the industry envision crystal clear voice service, video conferencing from anywhere, high speed mobile Web surfing, and thousands of advanced applications right over the wireless phone or handheld PC. Generally, any enhancement to the system that can improve delivery of high-speed data, voice and video over mobile devices along with increasing the battery life are challenging topics for consideration and improvement.

In papers entitled "Symbol Rate and Modulation Level-Controlled Adaptive Modulation/TDMA/TDD System for High-Bit-Rate Wireless Data Transmission," by T.Ue, S. Sampei, N. Morinaga, and K. Hamaguchi, published in the IEEE Transaction on Vehicular Technology, Vol. 47. No. 4, Pp. 1134–1147, November 1998, pages 1134–1147, and "Adaptive Coding and Processing Gain Control with Channel Activation for Multimedia DS/CDMA System," by S. Abeta, S. Sampei, and N. Morinaga, published in IEICE Transaction on Communication, Vol. E80-B, No. 4. April 1997, pagesthe authors propose a symbol rate, gain and coding change scheme through the use of feedback transmission of the information from the Base Station (BS) to the Mobile Station (MS). In these proposals the quality of the channel was determined on the basis of the calculation of the short-term signal to interference ratio $C/(N_0+I_0)$ at the BS receiver, where C is Signal Power; $N_0$ is AWGN Power, and $I_0$ is Interference from other users. However, in a wideband environment, due to the presence of Inter-Symbol Interference (ISI), the short term Signal To Noise Ratio (SNR) is inadequate for measuring the quality of the channel, as described in an article entitled "Upper-bound Performance of a Wideband Burst-by-Burst Adaptive Modem," by C. H. Wong, and L. Hanzo, published in the IEEE Vehicular Technology Conference. Document 483. May 1999, pages .

In these adaptive schemes, thresholds are set based on the probability distribution function (pdf) of the channel power. In a 1-user model with one channel path, the pdf of the channel power would be an exponential or chi-square function with 2 degrees of freedom. However, in a CDMA receiver, normally the rake receiver has several fingers. That is at the receiver, the system either estimates or predicts the channel coefficients at each rake finger and performs maximal ratio combining by multiplying each finger with its conjugate or chooses the ones with the highest energy and performs maximal ratio combining on the selected fingers. In either case system performs the long-range power prediction of each finger at the transmitter to compute the total channel power.

Other prior art related to WCDMA systems with improved performance include:

U.S. Pat. No. 5,822,381 to E. Tiedemann, Jr. et al., issued Oct. 13, 1998 (Tiedemann) discloses a method and apparatus for controlling transmission power in a variable rate communication system. The method disclosed provides for a closed loop power control method. A first remote station controls the transmission power of a second remote station by transmitting a rate dependent power control signal to the second remote communications system. Since only the second communications system knows its transmission rate a priori, it must determine a course of action in accordance with both the received power control signal and the knowledge of its transmission rate.

U.S. Pat. No. 5,715,526 to L. A. Weaver, Jr., et al., issued Feb. 3, 1998, (Weaver) discloses an apparatus and method for controlling a final transmit power, Y of a base station in a cellular communications system that has several channels. The base station has a transmit power tracking gain, Y' and a radio frequency transmit power, W. The apparatus comprises channel elements for calculating expected power $P_{k,a}$–$P_{kf}$, each of which corresponds to a channel. The apparatus also comprises a transceiver system controller (BTSC) for generating a desired output power, $Y_d$ of the base station, including an adder for summing the expected powers. The apparatus also includes a transmit power detector for measuring 'Y' to obtain the measured transmit power. The apparatus further comprises a radio frequency interface card (RFIC) for generating 'Y'. Finally, the apparatus includes a gain unit for processing 'Y' and W to obtain the final transmitted power, Y.

U.S. Pat. No. 5,383,219 to C. E. Wheatley, III, et al., (Wheatley) issued Jan. 17, 1995, discloses a power control process which enables a mobile radio telephone to continuously update the base station on the power output required. The base station sends a frame to the mobile at a particular rate. If the mobile received and decoded the frame correctly, the mobile sets a power control bit and the next frame to be transmitted to the base station. Based on the error rate of the received power control bits, the base station determines whether to increase or decrease the transmit power.

U.S. Pat. No. 5,729,557 to S. H. Gardner, et al, issued Mar. 17, 1998, (Gardner) discloses a method and apparatus for using multiple code rates for forward error correction in a cellular digital radio communication system. Each base station broadcasts a quantity called the power product (PP) which is equal to the base transmit power, $P_{BT}$ multiplied by the power level received at the base station, $P_{BR}$. For a mobile-unit to determine it's appropriate transmit power, $P_{MT}$ requires measuring the power received, $P_{MR}$ at the mobile unit and performing a calculation. When the channel path loss is large it is possible that the power control calculation will return a value greater than the maximum transmit power capability of the mobile unit. In such case, the mobile unit selects a lower code rate. The base station receiver sensitivity improves as the code rate decreases, so the result is similar to increasing the transmit power. In the preferred embodiment, the invention uses three different code rates. In most cases, the code rate used is two-thirds, but when a mobile unit determines that it needs more transmit power than it is capable of providing, the code range is changed to one-half, and in severe cases the code rate is changed to one-third.

JP6-276176 to Tetsuyoshi et al, published Sep. 30, 1994 (Tetsuyoshi) discloses reducing intra-signal interference at the time of demodulating signals from respective remote stations by preparing plural chip rates and appropriately allocating them for the respective remote stations. When the power level of reception signals initially detected by reception power detection or the signals from remote stations, a chip rate deciding circuit judges that the reception power level causes strong interference and the inverse spread demodulation of the signals. The present chip rate in this case is changed and the remote station is informed from a chip rate informing circuit. In a remote station a spreading code is generated corresponding to the chip rate informed from the base station. A spreading code is generated supplied to a spectrum spread modulation part to perform spread spectrum spread modulation and transmitted to the base station. Thus, the base station performs an inverse spread processing by the chip rate and interference is reduced at the remote stations.

In prior art systems, past estimates of the signal to interference ratio are used to adjust the transmitter power. Due to the fading of the wireless channels, past estimates of the received SNR is not an adequate technique for optimum power control. None of the prior art uses future prediction of the channel power by calculating a long-range prediction of each finger of a rake receiver and based on the estimated total channel power distribution function to set the optimum threshold to control transmitter gain and rate as in the present invention.

SUMMARY OF THE INVENTION

An object of the invention is a communication system such as a WCDMA system and method of operation having adaptive modulation for improved system throughput, channel capacity and transmit power control.

Another object is a WCDMA system and method of operation with improved adaptive power management using power levels of a Rake Receiver configuration.

Another object is a WCDMA system and method of operation which predicts power levels of each finger in a Rake receiver and the strongest power levels being used in determining the optimum transmitter power or rate control for operating the system transmitters and receivers.

These and other objects, features and advantages are achieved in a WCDMA system and method which maximizes throughput, control channel capacity/transmit power and maintains connectivity between a base and a mobile station using the predicted power levels of each finger in a rake receiver with the strongest ones used in determining the optimum transmitter power or rate control for operating the system tranmitters and receivers. The WCDMA system includes a Base Station (BS) or forward transmitter and a pilot channel that transmits control signals between a Mobile Station (MS) and BS to reconfigure their transmitter/receiver according to the prediction of the channel power and channel power probability density function separated into three distinct equal probable regions. Data signals are encoded using a one-half Viterbi encoder and interleaved. The interleaved data bits are modulated using Quadrature Phase Shift Keying (QPSK) modulation. The QPSK data is multiplexed with the pilot channel and spread by an appropriate code in an OFDM transmitter modified by a long code. Output of the transmitter may be provided to two diverse antennas for reliable communications to the receiver. Data may be received at two diverse antennas. The outputs are provided to match filters coupled to a coherent rake receiver and a channel prediction system. The future attenuation of the channel coefficients and power are determined by the prediction system for several milliseconds. The power levels of each finger in the Rake receiver can be predicted and the strongest ones used in determining the optimum transmitter power or rate control for operating the system transmitters and receivers based on computing a long range power prediction of each finger of the rake receiver.

DESCRIPTION OF THE DRAWING

The invention will be further understood from the following detailed description of a preferred embodiment taken in conjunction with an appended drawing, in which.

DESCRIPTION OF PREFERRED EMBODIMENT

Figure 1:
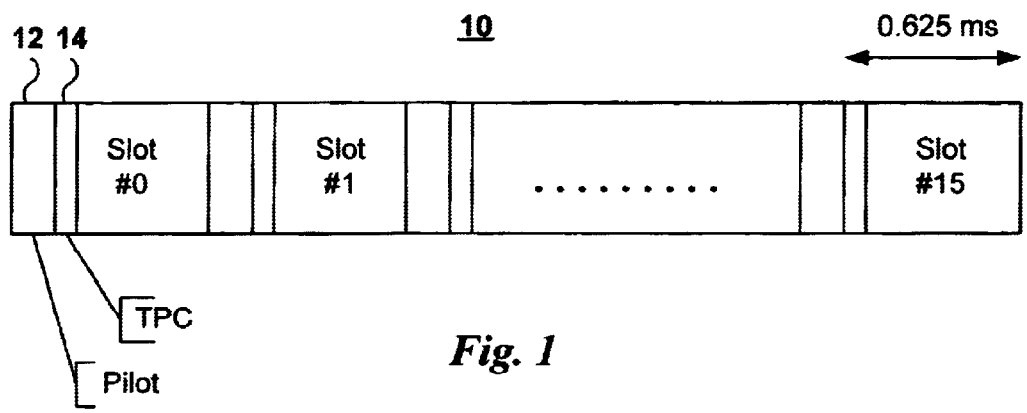
FIG. 1 is a representation of a frame structure in a WCDMA time slot in the system of FIG. 2.

In WCDMA systems, symbols are transmitted using Quadrature Phase Shift Keying (QPSK) and Direct Sequence CDMA (DS-CDMA). The chip rate is 4.096 MHz. Each physical channel is organized in a frame structure, such that each slot consists of 2560 chips. This is described in an article entitled "Channel Estimation for the W-CDMA System, Performance and Robustness Analyses from a Terminal Perspective," by B. Lindof, C. Ostberg, and H. Eriksson, published in the IEEE Vehicular Technology Conference. Document 90. May 1999. FIG. 1 illustrates a W-CDMA frame structure 10 including time slots 0 through 15. Each frame includes pilot bits 12 and transmitter power control bits 14. For the down link, pilot symbols are time-multiplexed with data symbols and every slot starts with a group of pilot symbols (4 or 8) which maybe used to estimate or predict the channel and perform synchronization.

Figure 2:
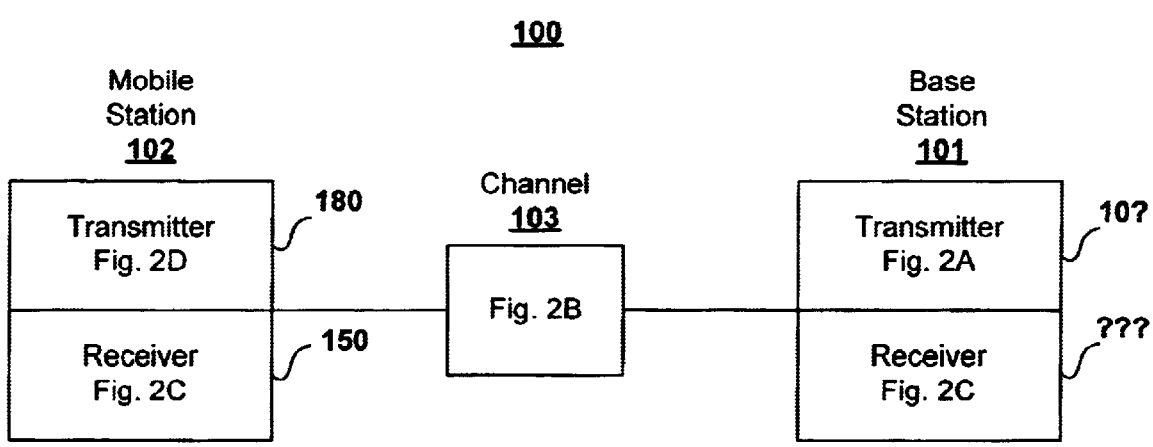
FIG. 2 is a layout of base station and a mobile station in a WCDMA system incorporating the principles of the present invention.
Figure 2A:
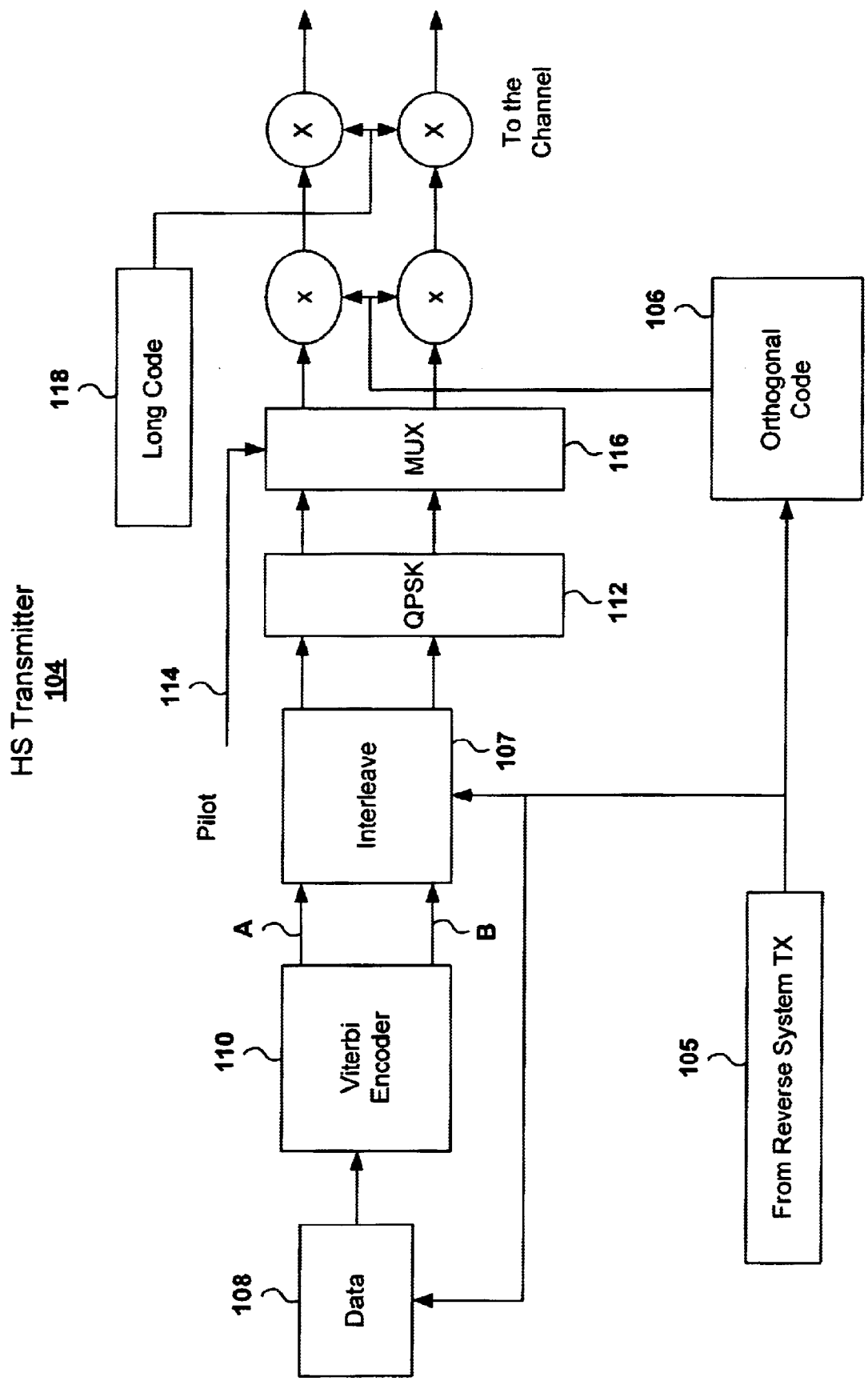
FIG. 2A is a block diagram of a base station transmitter in FIG. 2.
Figure 2B:
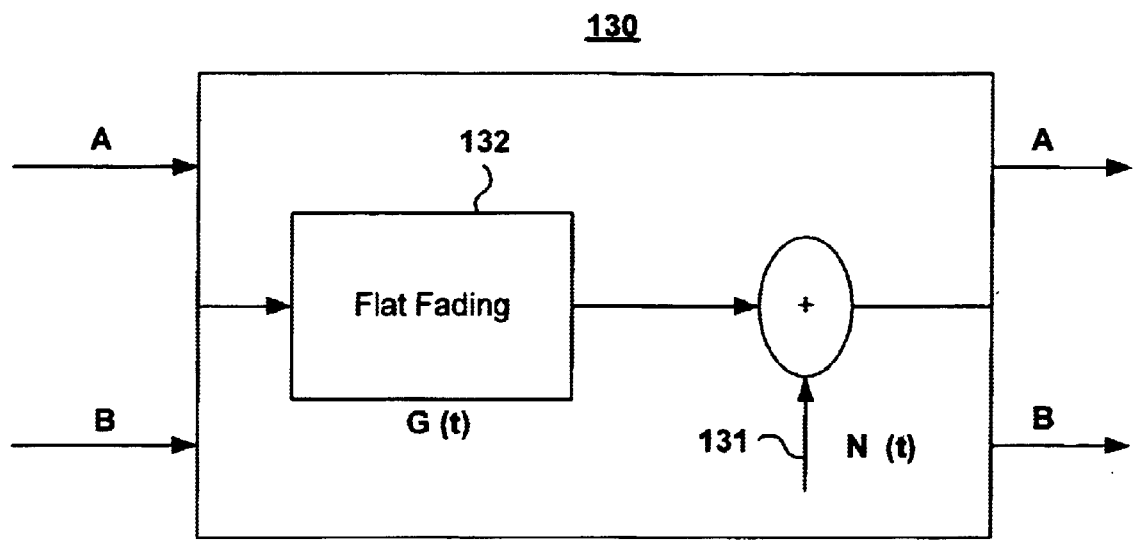
FIG. 2B is a block diagram of a channel baseband model included in FIG. 2.
Figure 2C:
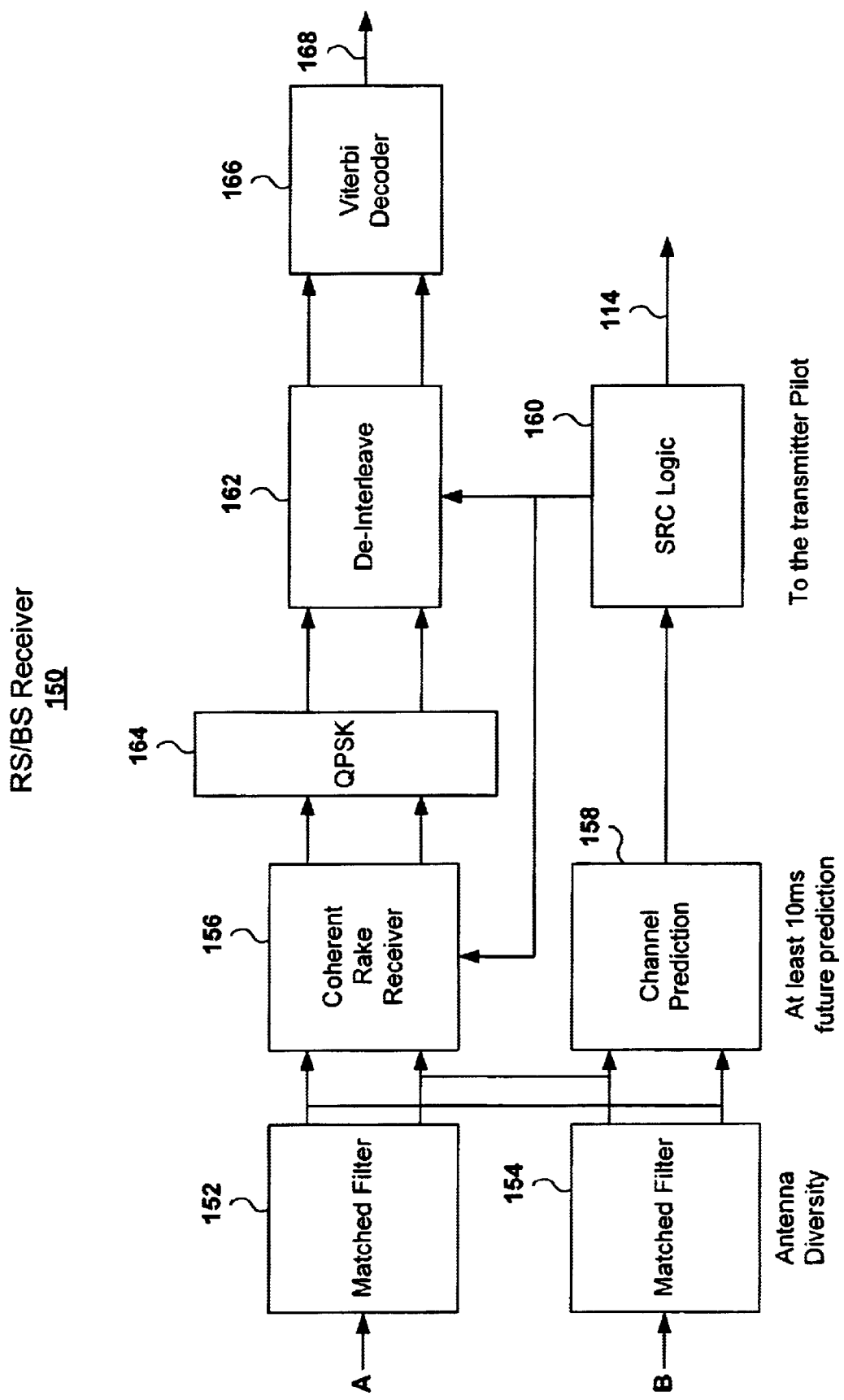
FIG. 2C is a block diagram of mobile or base station receiver in FIG. 2.
Figure 2D:
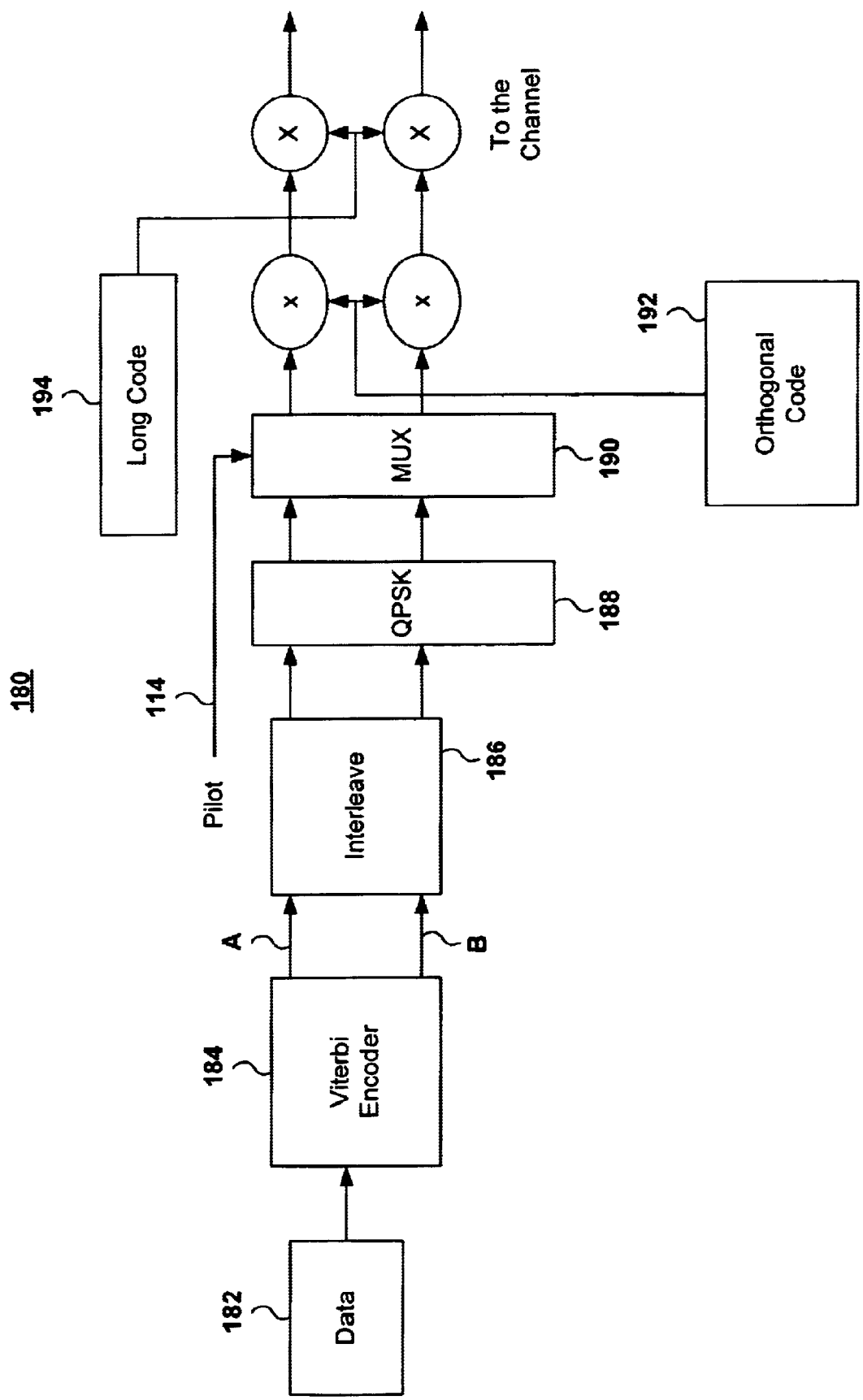
FIG. 2D is a block diagram of a mobile station transmitter in FIG. 2.

The present invention proposes a technique for adaptive modulation of a WCDMA system 100 shown in FIGS. 2–2D. It uses an algorithm for "Deterministic Channel Modeling and Long Range Prediction of Fast Mobile Radio Channels," by T. Eyceoz, A. Duel-Hallen, and H. Hallen (Eyceoz), published in the IEEE Communication Letters, Vol. 2, No. 9, September 1998 for long range prediction of the mobile channels.

In FIG. 2, a base station 101 is linked to a mobile station 102 through a channel 103, as further shown in FIGS. 2A–2D.

In FIG. 2A, a base station or forward system transmitter 104 includes a terminal 105 for receiving a reverse transmitter signal. This is provided as an input to an orthogonal code generator 106 and an interleaver 107 for combining the reverse transmitter signal with a data source 108 after processing by a Viterbi encoder 110. The processed signal as data symbols is separated into first and second channels, real and imaginary, A and B, coupled to a Quadrature Phase Shift Keying (QPSK) unit 112. A Multiplexer 116 retrieves the channel A channel B outputs from the QPSK unit 112 and time multiplexes a pilot signal 114 with the data symbols in a series of data frames 10 (See FIG. 1), as will be explained in more detail hereinafter. The data frames are transmitted in channels A and B to a mobile receiver 150 (See FIG. 2C) using the OFDM Code generator 106 modified with a spreading or long code 118, as will be described in more detail hereinafter.

In FIG. 2B, a baseband model 130 is shown for channels A and B. Each channel is modeled as an Additive White Gaussian Noise (AWGN) 131 and a Time Bearing Flat Fading (TBFF) 132 in which the selected fading due to the multipath is negligible.

In FIG. 2C, a mobile station or reverse system receiver 150 is similar to the base or forward receiver 170 (See FIG. 2). Each receiver includes matched filters 152, 154 for antenna diversity in receiving channels A and B. The outputs of the match filters are fed into a coherent rake receiver 156 and a channel prediction or estimation system 158. The channel prediction system determines the future attenuation of the channel for several milliseconds as described in the Eyceoz article, supra. The time interval is enough to allow both the base station and the mobile station to reconfigure their transmitters and receivers. An SRC/TPC logic device 160 uses the prediction of the channel power and the channel coefficients to signal both the transmitter and receiver to reconfigure the channel power and/or channel rate according to whether the channel power is above or below a threshold level, as will be described in FIGS. 7 and 8, hereinafter. The SRC/TPC logic 160 provides an input to the rake receiver 156 and to a de-interleaver 162 to adjust the transmission rate in both channels A and B during and after processing of the data in a QPSK device 164. The SRC logic can also determine which antenna is receiving the signal more accurately and signal its or remote transmitter to use that antenna for transmission to the base station which can reduce Multi Access Interference (MAI). The de-interleaver 162 provides an output to a Viterbi decoder 166, which provides an output signal 168 to a user. A dedicated pilot channel 114 is used to signal the mobile station or the base station to reconfigure.

In FIG. 2D, a mobile station or reverse system transmitter 180 includes a data source of symbols 182 encoded in a Viterbi encoder 184 and separated into channels A and B. The signals are processed by an interleaver 186 and a rate one-half Viterbi encoder. The interleaved data bits are mapped in a QPSK modulator 188. The QPSK data is processed in a multiplexer 190 with the pilot signal 114 from the receiver 150. (See FIG. 2C.) An OFDM unit 192 spreads the multiplexer output in channels A and B by an appropriate orthogonal code after which a long code 194 is added corresponding to the orthogonal code length negotiated at call establishment. An output of the channels A and B is over sampled in pulse chap before being sent to the channel.

In wireless systems, a propagation channel is usually modeled as Raleigh distributed. Therefore the channel power has a chi-square probability distribution with 2 degrees of freedom. The following equations illustrate this relation:

$$p(y) = \frac{1}{2\sigma^2} e^{-y/2\sigma^2}$$

Where:

$P^{(Y)}$ is $_{Channel\ Power}$ $pdf_{y=\alpha}{}^2$;

$\sigma^2$=variance.

In general, the Chi-square function of m degrees of freedom that is described in a book entitles "C. W. Helstrom, Statistical Theory of Signal Detection, rev. $2^{nd}$ Ed. New York: Pergamon, 1968," Is the sum of the squares of m normally distributed random deviates, each having unit variance.

The pdf of the signal-to-noise ration (SNR) at the receiver for flat fading 1-path channel is $$p(\gamma_b) = \frac{1}{\overline{\gamma}_b} e^{-\gamma_b/\overline{\gamma}_b}$$

In general the pdf of the $\gamma_b$ for multi-paths fading channel where the channel power has Chi-square characteristic function with 2L degree of freedom is given by $$p(\gamma_b) = \frac{1}{(L-1)!\,\overline{\gamma}_b^L}\gamma_b^{L-1}e^{-\gamma_b/\overline{\gamma}_b}$$

Figure 3:
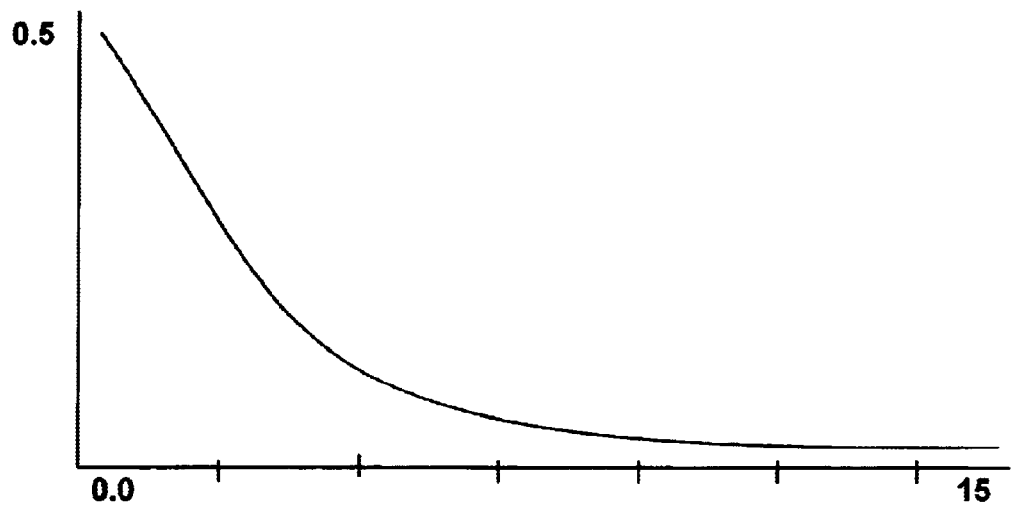
FIG. 3 is a graph of a channel power probability density function (pdf) and having a chi-square distributed random variable for two (2) degrees of freedom in the system of FIG. 2.

FIG. 3 illustrates a power density function (pdf) 30 of a chi-square-distributed random variable for 2 degree of freedom, as more fully described in a book entitled "John Proakis, Digital Communications. New York: McGraw Hill, 1995. Applying a long-range channel prediction process, a 10 ms prediction time in one W-CDMA frame, a Base Station (BS) can predict the channel power profile of a Mobile Station (MS). The pdf of the predicted channel power should theoretically be similar to the one in FIG. 3.

Figure 4:
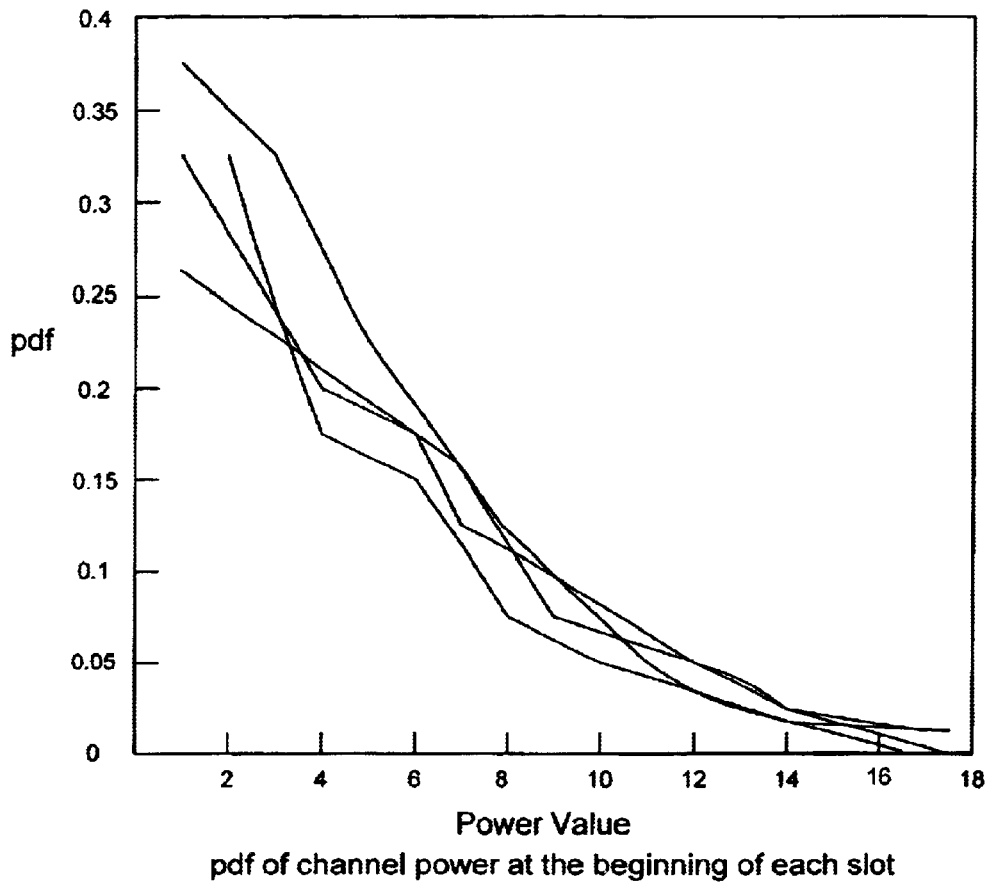
FIG. 4 is a graph of channel power probability density function versus power value at the beginning of each WCDMA time slot.

An experiment was conducted to prove the performance of the process. In this experiment, a BS prediction of the channel power was assumed at the beginning of each slot for the duration of a frame is perfect. The pdf of 4 Independent Identical Distributed (IID) channel powers 40 was computed and is illustrated in FIG. 4.

By definition to obtain the probability of error for a BPSK (2 BPSK same as QPSK) system is evaluated by the integral, $$P_2 = \int_0^\infty P_2(\gamma_b)p(\gamma_b)\,d\gamma_b$$

The resulting for the flat fading system is evaluated by the integral, $$P_2 = \frac{1}{2}\left[1 - \sqrt{\frac{\overline{\gamma}_b}{1+\overline{\gamma}_b}}\right]$$

The general Closed-form solution of the error probability for the multipath fading channel model can be expressed as:

$$P_2 = \left(\frac{1-\mu}{2}\right)^L \sum_{k=0}^{L-1}\binom{L-1+k}{k}\left(\frac{1+\mu}{2}\right)^k \text{ where, } \mu = \sqrt{\frac{\overline{\gamma}_b}{1+\overline{\gamma}_b}}$$

Figure 5:
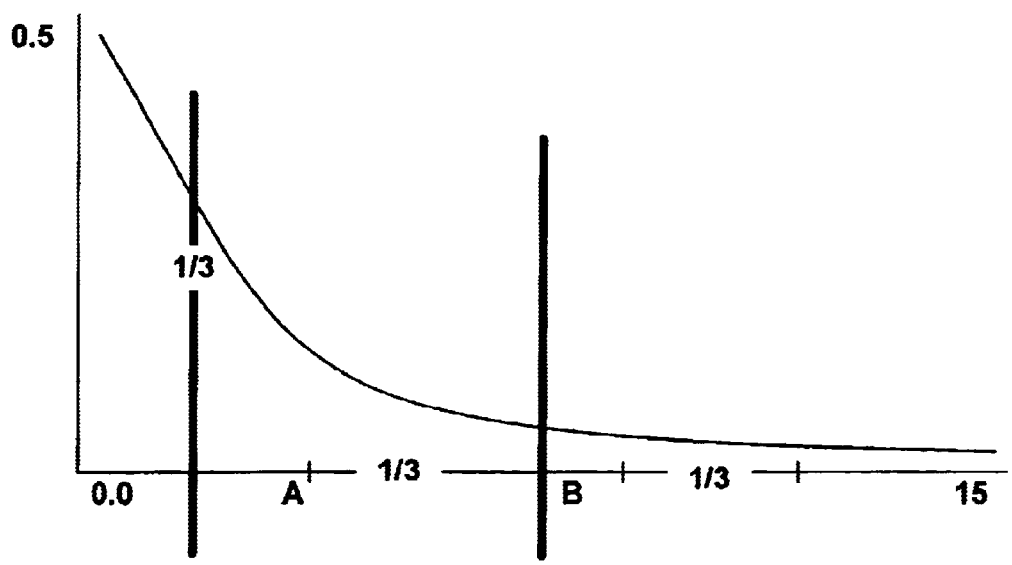
FIG. 5 is a graph of channel power pdf separated into three equal probable regions for the system of FIG. 2.

In the present invention, the pdf of the channel power is divided into several regions in which the probability of every region is equal. FIG. 5 illustrates a three-region pdf of the channel power.

$$P_2 = \int_0^A P_2(\gamma_b)p(\gamma_b)\,d\gamma_b + \int_A^B P_2(\gamma_b)p(\gamma_b)\,d\gamma_b + \int_B^\infty P_2(\gamma_b)p(\gamma_b)\,d\gamma_b$$

Figure 6:
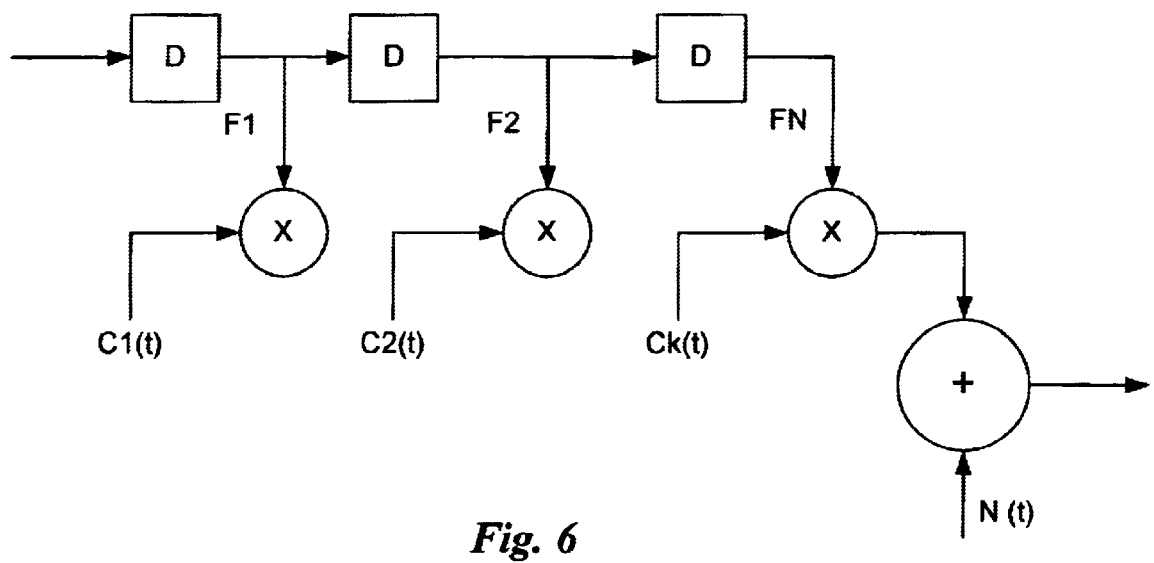
FIG. 6 is a graph of pdf of the chi-square function for 2, 4, 6, and 8 degrees of freedom.

In the case where the pdf is divided into three equal probable regions (0-A; A-B; B-∞), the area under the exponential curve for each region is equal to 0.333 In other words, the probability that the system operates in poor, nominal and high channel conditions are the same. In the three-region system of FIG. 5, the above equations for the channel power becomes as follows. In the following equation, A and B are normalized for each region with their corresponding SNR value In a multipath enviroment, the channel is modeled as a tapped delay line D that is illustrated in FIG. 6. In one embodiment, the system either estimates or predicts channel coefficients at each rake finger F(1) . . . F(N) and performs maximal ratio combining by multiplying each finger F with its conjugate C or chooses the fingers with the highest energy and performs maximal ratio combining on the selected fingers. Threshold values may vary based on the number of rake finger used. In either case, the system performs long-range power prediction of each finger at the transmitter to compute the total channel power. Assuming a rake receiver has four (4) fingers with each multipath corresponding to one of the fingers, if the receiver chooses only two (2) of the highest power paths, which is using only two (2) fingers out of four (4), the total channel power considering the two (2) strongest paths is a chi-square function with four (4) degrees of freedom. Consequently, the threshold for adjustment of Adaptive Transmitter Power Control would be different from the previous case. Further details on a rake receiver and channel model are provided in the text "Digital Communications" by J. Proakis, published by McGraw Hill, New York, N.Y. (1995), pages 728–733 and fully incorporated herein by reference.

Since the predicted power level of every transmit slots is available at a Mobile Station (MS), a system can configure its transmitter at the beginning of each slot time. In this case the MS can optimize its transmitter in order to minimize its probability of error at the Base Station (BS) receiver. Optimization improves the quality of the system by improved adaptive power control using the following techniques: (a) Transmitter Power Control (TPC) bits provided in the W-CDMA slots; Seamless Rate Change (SRC) using pilot bits, (c) Adaptive Transmitter Diversity (ATD) using pilot bits, and (d) adaptive power management based on a rake Receiver configuration, as follows:

A. General Procedure

The MS transmitter modifies transmitter power rate by change a spreading factor (SF) or antenna based on a threshold set by the BS. In such case, either the MS or BS compute "B & C" values (FIG. 5.). These values are selected such that the system operates 33% of time in low-power region (0-A), 33% in the optimum power level (A-B) and 33% in the higher power region (B-∞). Since the total average power is 1, the long-term average power of the three-region system is also equal to 1.

B. TPC

Figure 7:
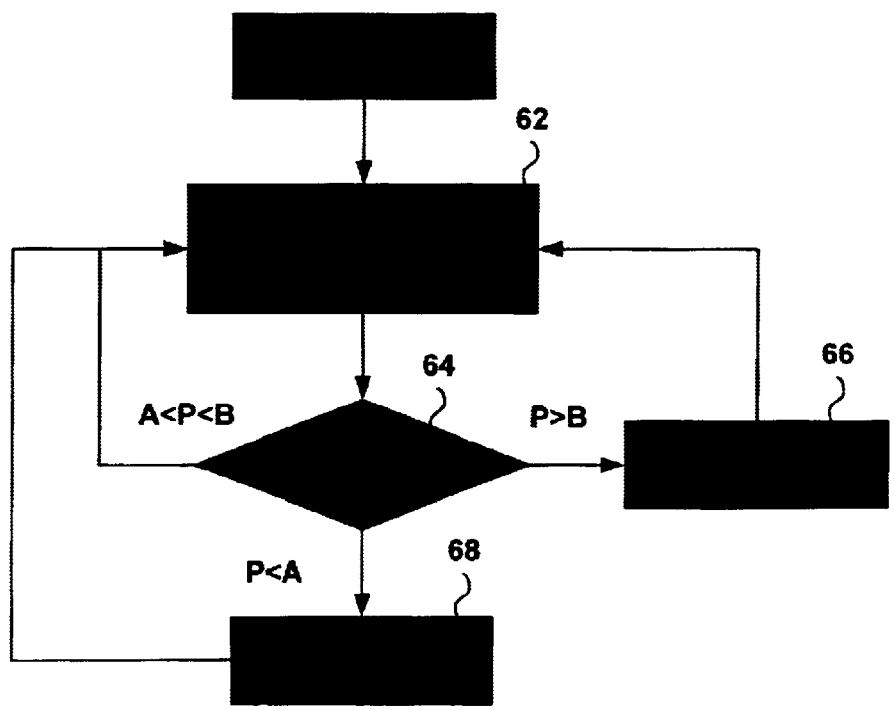
FIG. 7 is a model of the channel as a tapped delay line.

When the system operates in a TPC mode, and when the predicted channel power falls below the "A-0" range, the system increases the transmitter power by 3 dB. When the predicted channel power goes above the "B" range, the system reduces its transmitter power by 3 dB. And finally the system makes no adjustment when the predicted channel power lies between "A & B." FIG. 7 shows a flowchart 60 for the BS transmitter when operating the system in the TPC mode, as follows:

At start, the system receives one frame of seamless rate change commands (SRC) 62. A test 64 is performed in which the TPC bits are checked in each slot. When the predicted power (P) is in the 0-A range, the system increase the transmitter power by 3 dB by decreasing the rate in step 66. When the predicted power (P) goes above the B range, the system reduces the transmitter rate by 3 dB by increasing the rate in step 68. When the predicted power is within the A and B ranges, the system makes no adjustment to the transmitter power.

C. SRC

Figure 8:
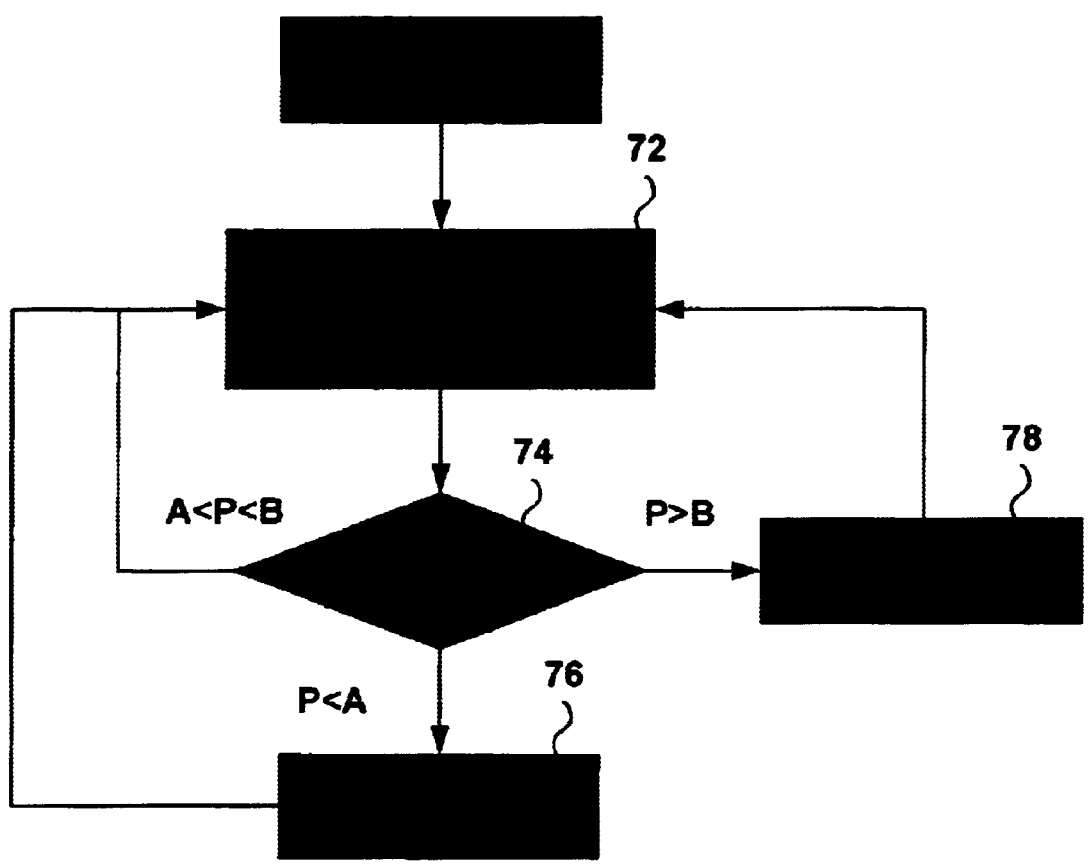
FIG. 8 is a flow chart of the base station transmitter in the system of FIG. 2 using Transmitter Power Control (TPC) bits in the WCDMA time slots for power management.

FIG. 8 shows a flow chart 70 illustrating the operation of the system in the seamless rate change (SRC) mode. At start, the system receives one frame of seamless rate change commands (SRC) 72. A test 74 is performed in which the SRS bits are checked in each slot When the predicted channel power falls below "A" range, the transmit rate is reduced in a step 76 and a longer spreading code (2*SF)is used. In step 78, when the predicted channel power goes above the "B" range, transmitter rate is increased and a shorter spreading code (½*SF) is used. And finally the system makes no adjustment when the predicted channel power lies between "A & B."

Figure 9:
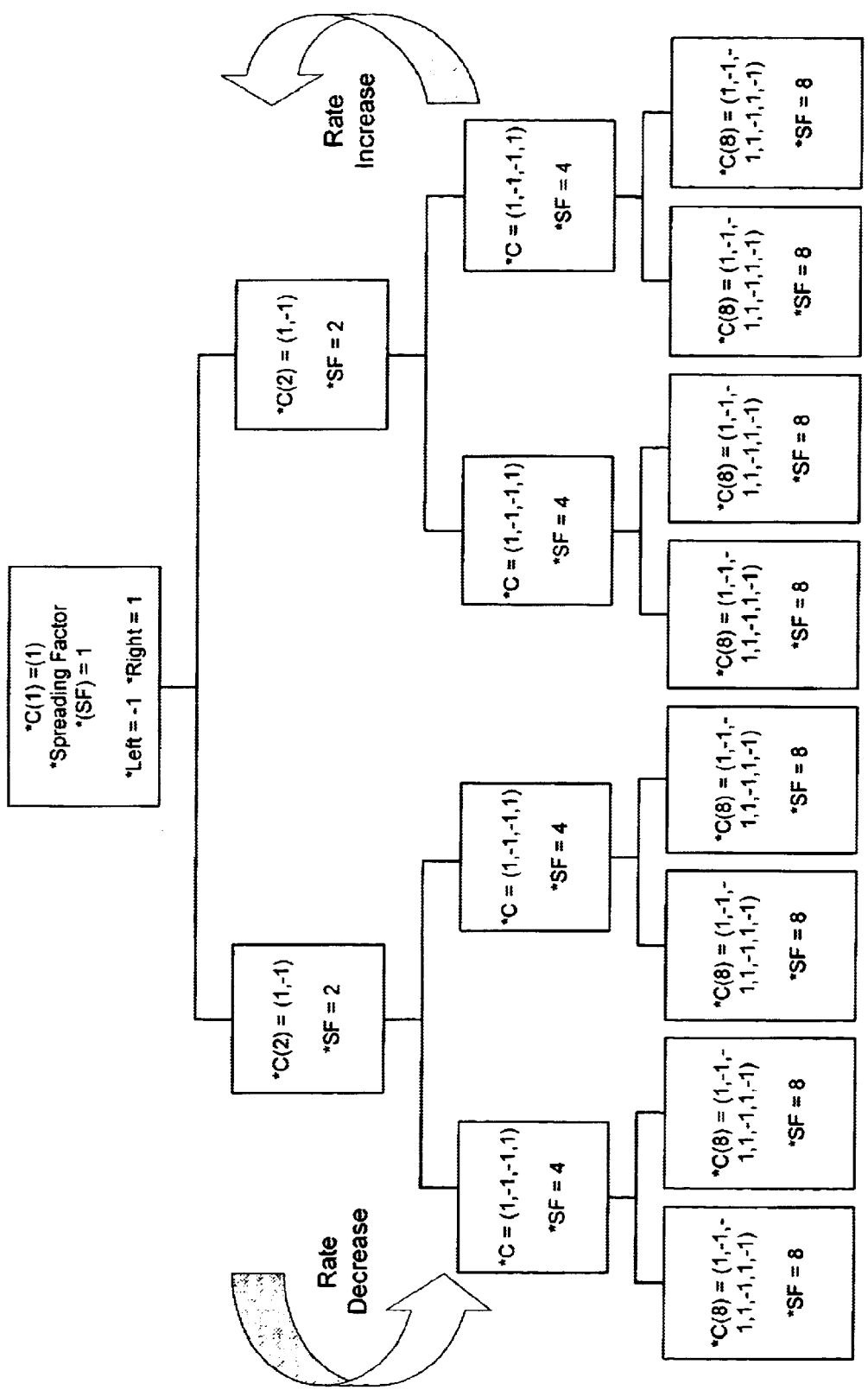
FIG. 9 is a flow chart of the base station transmitter in the system of FIG. 2 when operating the system with Seamless Rate Change (SRC).

In FIG. 9, an algorithm 80 adjusts the spreading code C (1). When the predicted channel power falls below a threshold, the transmitted rate is reduced and a longer spreading code is used. In block 84 the spreading code is doubled when the threshold level is exceeded. The spreading code is increased to 4 and 8 in blocks 86 and 88. When the predicted channel power goes above the threshold, the transmitter rate is increased and a shorter spreading rate spreading code is used as shown in blocks 85, 87 and 89. The spreading code is not adjusted when the predicted channel power lies at the threshold level.

D. ATD

Figure 10:
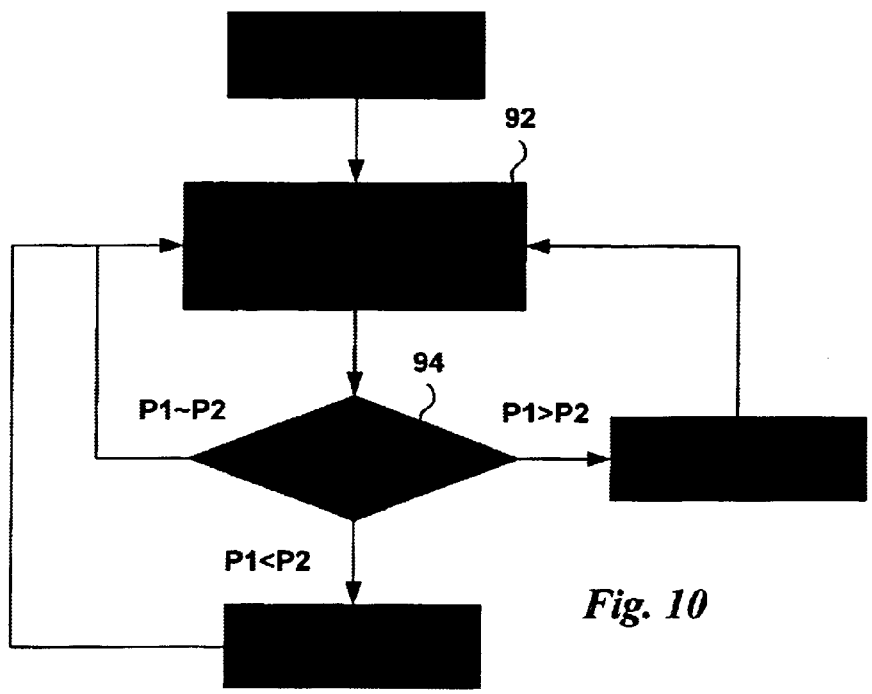
FIG. 10 is a flow chart for selection of a spreading code in the system of FIG. 2 when a system modifies transmitter rate.

FIG. 10 illustrates a flowchart 90 for the BS transmitter when operating the system with Adaptive Transmitter Diversity. When the System operates in ATD mode, the BS receiver predicts the channel power for the two input receivers after receiving a frame of Power (P) commands in step 92. The BS transmit the predicted channel power values of one frame to the MS receiver via the pilot bits. Similar to the TPC or SRC processes 60, 70, the MS compares the Power values to the threshold in a step 94 and selects the transmit antenna #1 or #2 that propagates through the better of the two transmit paths. This process can be reversed and the role of BS and MS can be altered such that the BS perform the antenna selection and the MS performs the prediction.

Figure 11:
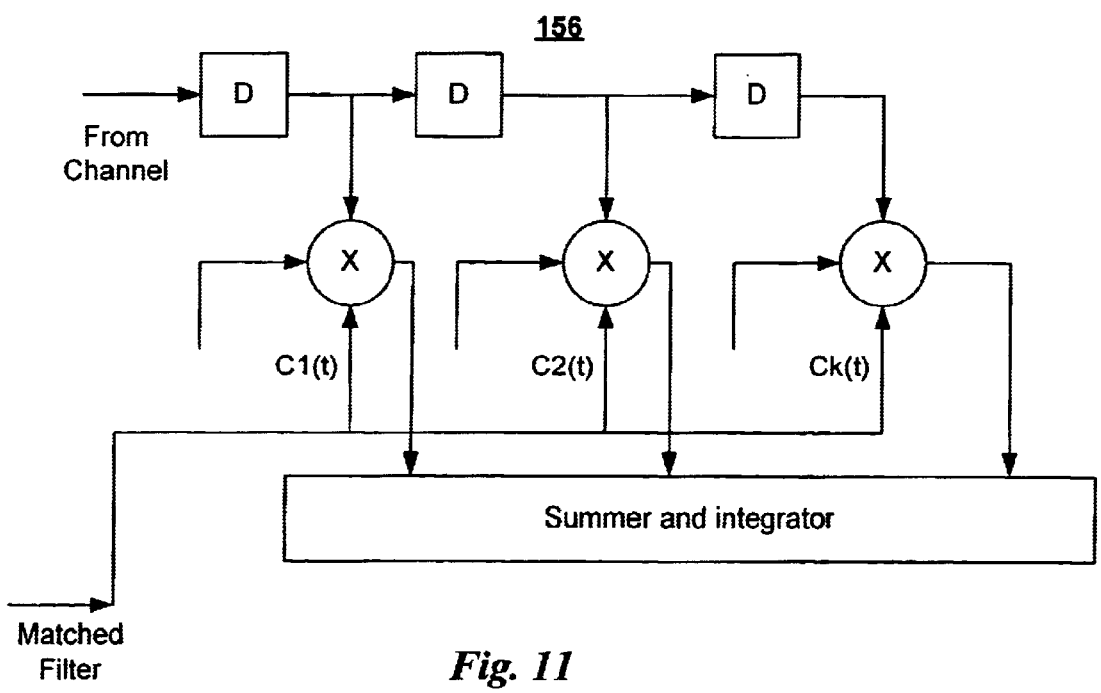
FIG. 11 illustrates an optimum demodulator for a CDMA system based on a rake receiver configuration of FIGS. 2–2D and 7.

E) Rake Receiver Configuration:

FIG. 11 illustrates an optimum demodulator for CDMA system based on a Rake receiver 156 (See FIG. 2c) configuration. As illustrated, the rake receiver 156 may use all or some of the fingers output to sum and integrate. Based on a decision made at the receiver, the system can determine the number of the fingers that are going to be used at the receiver and report to the transmitter for the optimum power and rate management. As explained previously, the threshold values may vary based on the number of rake finger used. The finger information may be transmitted to the transmitter from the receiver for computation of the optimum threshold value.

Summarizing, a WCDMA system has been disclosed with adaptive channel power control using Transmitter Power Control Bits (TPCB) in the frame transmit slots and seamless rate change and/or adaptive transmitter diversity using pilot bits. The WCDMA system is capable of supporting variable data rate by configuring its receiver and transmitter to the data rate determined at a call establishment or adaptively change during transmission. It can be accomplished by means of estimating or predicting the channel coefficients at each rake finger and performing maximal ratio combining by multiplying each finger with its conjugate or chooses the ones with the highest energy and performing maximal ratio combining on the selected fingers. In either case system performs the long-range power prediction of each finger at the transmitter to compute the total channel power. Pilot set channels associated with individual data channels carry control signals to adjust transmit and receive power levels accordingly. As a result, throughput is maximized, channel capacity increased while reducing transmit power and overall maintaining connectivity.

While the invention has been shown and described in a preferred embodiment, various changes can be made without departing from the spirit and scope of the invention as defined in the appended claims, in which:

I claim:

1. A Wide-band Code Division Multiple Access ("WCDMA") system comprising a base station and a mobile station;
   a channel including a baseband signal having a variable transmission rate and including a pilot channel coupling the base station and the mobile station;
   means responsive to the baseband signal for predicting future power attenuation on the channels based on computing a long range power prediction of each finger of a rake receiver; and
   means responsive to the channel prediction means to signal both the transmitter and receiver over the pilot channel to reconfigure the transmission rate according to the predicted power attenuation.

2. The system of claim 1 further comprising means establishing a power threshold in the channel.

3. The system of claim 2 further comprising means for increasing the transmission rate when the predicted channel power goes above the threshold.

4. The system of claim 2 further comprising means for decreasing the transmission rate when the predicted channel power falls below the threshold.

5. The system of claim 1 further comprising:
   means for estimating or predicting channel coefficients at each rake finger F(1) . . . F(N); and means for performing maximal power ratio combining by multiplying each finger F with its conjugate C.

6. The system of claim 1 further comprising:
   means for choosing the fingers with the highest energy and performing maximal ratio combining on the selected fingers.

7. In a wide band code division multiple access ("WBCDMA") system comprising a base station transmitter and receiver, a mobile station transmitter and receiver, dual channel each including a baseband signal having a variable transmission rate and a pilot channel coupling the base station and the mobile station, a method for improved throughput, channel capacity and transmit power control of the system, comprising the steps of:
   predicting future power attenuation on the channels based on computing a long range power prediction of each finger of a rake receiver; and
   signaling both the transmitter and receiver over the pilot channel to reconfigure the transmission rate according to the predicted power attenuation.

8. The method of claim 7 further comprising the step of: establishing a power threshold in the channels.

9. The method of claim 7 further comprising the step of: estimating or predicting channel coefficients at each rake finger F(1) . . . F(N); and performing maximal power ratio combining by multiplying each finger F with its conjugate C.

10. The method of claim 7 further comprising the step of: choosing the fingers with the highest energy and performing maximal ratio combining on the selected fingers.

11. The method of claim 8 further comprising the step of: increasing the transmission rate when the predicted channel power goes above the threshold.

12. The method of claim 11 further comprising the step of: decreasing the transmission rate when the predicted channel power falls below the threshold.

* * * * *